April 18, 1967 A. LABAT Re. 26,193

FILLING ARRANGEMENT FOR A LIQUEFIED GAS LIGHTER

Original Filed March 28, 1961 2 Sheets-Sheet 1

INVENTOR:
Antoine Labat

BY

Christy, Parmelee & Stickland his ATTORNEYS

FILLING ARRANGEMENT FOR A LIQUEFIED GAS LIGHTER

Original Filed March 28, 1961 2 Sheets-Sheet 2

INVENTOR.
Antoine Labat

BY

Christy, Parmelee & Strickland his ATTORNEYS

United States Patent Office

Re. 26,193
Reissued Apr. 18, 1967

26,193

FILLING ARRANGEMENT FOR A LIQUEFIED GAS LIGHTER

Antoine Labat, Paris, France, assignor to Societe Franco-Hispano-Americaine Francispam, Paris, France, a corporation of France Original No. 3,115,907, dated Dec. 31, 1963, Ser. No. 98,561, Mar. 28, 1961. Application for reissue Dec. 27, 1965, Ser. No. 559,008
13 Claims. (Cl. 141—295)

Matter enclosed in heavy brackets [ ] appears in the original patent but forms no part of this reissue specification; matter printed in italics indicates the additions made by reissue.

Gas lighters are known comprising a tank which is provided with a filling valve through which the liquefied gas passes from a storage or supply cylinder, and with a vending valve acting as an escape or blow-off to enable the gaseous mixture in the tank to be expelled to atmosphere by the entering liquefied gas (generally butane) which is to take its place. Other lighter tanks have special valves comprising two ducts, one for filling with liquefied gas and the other for expulsion of the gasous mixture to atmosphere. These various types of escape valves form an integral part of the actual lighter or of a tank detachable therefrom.

The invention relates to a filling arrangement for a liquefied gas lighter, comprising in combination a supply valve on the gas-supply cylinder and a lighter valve in the wall of the tank of the lighter, each valve being spring-operated in closing and provided with a projecting stem, the two stems coming into contact with one another in order to produce opening of the two valves, and the spring of the gas-supply cylinder valve being more powerful than that of the lighter valve, that the casing of the gas-cylinder valve terminates in a cylindrical nozzle, characterized in that the outer edge of said nozzle is formed with a notch which connects the interior of the nozzle, and hence the interior of the supply cylinder, to a slot formed in the wall of the lighter valve casing in a plane perpendicular to the axis of said casing at a distance from the top wall of the tank determining the height of a desirable safety zone in which there is to be a gaseous mixture when the tank is full, and that a second identical slot situated in the same plane but diametrically opposite the first slot communicates with an escape duct leading to atmosphere, the effective sectional area of said duct being very much less than that of the aforesaid notch.

In one embodiment, the length of the cylindrical nozzle is greater than the distance which, when the valve is in the open position, separates the free surface of the lighter valve head from the free end of the body of this valve, and the outside diameter of the gas-cylinder valve casing is less than the free diameter of the bore of the lighter valve casing.

In one arrangement according to the invention, the inside diameter of the lighter valve body is about 5–10 hundredths of a millimetre larger than the outside diameter of the cylindrical nozzle of the cylinder valve, and the drain or escape duct is formed by the annular space bounded by these elements during filling.

In a second arrangement, the cylindrical nozzle of the cylinder valve fits with slight friction into a gasket forming a seat for the lighter valve head, the drain or escape duct is formed by a groove disposed along a generatrix of the external cylindrical surface of said nozzle, and the notch is situated diametrically opposite said groove.

The following description with reference to the accompanying drawings will enable the invention to be more readily understood, and in the drawings.

Figure 1:
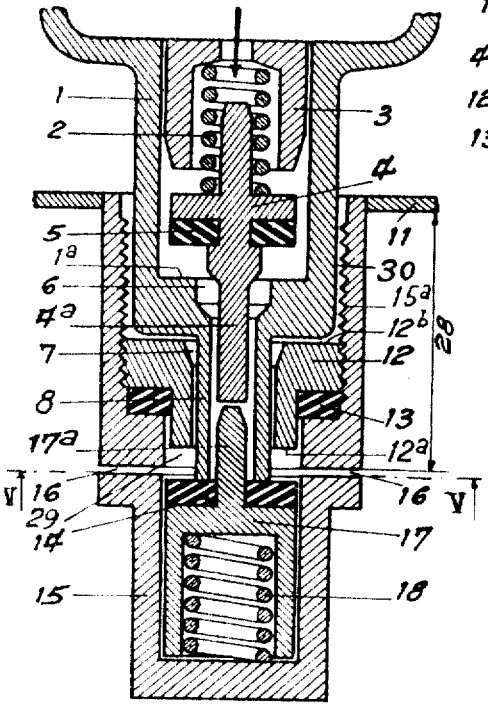
FIGURE 1 is an enlarged central vertical section of a complete valve system according to the invention, the two valve heads being shown open for the filling of the lighter.
Figure 2:
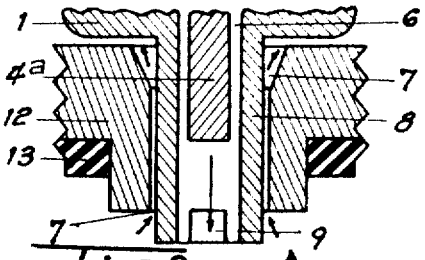
FIGURE 2 is a section on a still larger scale corresponding to part of FIGURE 1, and shows the position of the cylindrical nozzle of the gas-cylinder valve in the casing of the lighter valve.
Figure 3:
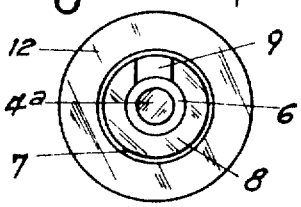
FIGURE 3 is an inverted plan view as seen in the direction of the arrow III in FIGURE 2.

Referring to FIGURES 1 and 2, it has been assumed that the filling system is disposed vertically, and it will be seen that the storage or supply cylinder containing the liquefied gas (generally butane) to be charged into the lighter, terminates in or is suitably connected to a supply valve casing 1 containing a spring 2, one end of which bears against a part 3 fixedly connected in known manner (not shown) to the casing 1 so as to permit the passage of the liquefied gas. The spring 2 normally applies a supply valve-head 4 against a seat 1a formed in the bore of the casing 1, the said valve-head 4 comprising a downwardly projecting stem 4a and a gasket 5, for example of rubber or similar material. An annular space 6 surrounding the stem 4a enables the liquefied gas to pass from the inside of the storage cylinder, when the valve-head 4 is open, to the interior of a hollow cylindrical nozzle 8 forming a downward extension of the casing 1, in which nozzle the stem 4a can move freely. The length of the nozzle 8 is preferably at least 5 mm. and its diameter preferably varies between 1.5 and 3 mm. at the maximum. The lower end of the cylindrical wall of the nozzle 8 is formed with a notch 9 (FIGURES 2 and 3), the function of which will be explained hereinafter.

Furthermore, the top wall 11 of the lighter tank is fitted with a cylindrical lighter valve casing 15 having an axial bore. The top part of this bore is of a much larger diameter than that of the gas-cylinder valve casing 1 so as to permit the free introduction of this casing, and it is screwthreaded at 15a. The top part of this screwthread is intended to receive a screw plug (not shown) which normally closes the filling opening of the lighter. Its bottom part receives a sealing and valve-seating assembly which includes an externally screw-threaded cylindrical valve body 12, and a sealing gasket 13, preferably of rubber or some similar material, bearing against an internal shoulder of the casing 15, this shoulder being formed at the point of junction of the two different diameters, of the bore. Said valve body 12 in turn has a bore, the diameter of which is only 5–10 hundredths of a millimetre larger than that of the nozzle 8, so as to form an annular space 7 of 2.5–5 hundredths of a millimetre thickness between these elements, this space forming an escape duct during filling of the lighter. A lighter valve-head 17 provided with an upstanding stem 17a and a gasket 14 slides in the smaller-diameter bore 29 of the casing 15. The valve-head 17 is urged against a seat 12a formed at the inner end of the body 12, by means of a spring 18 which is seated on the closed end of the casing 15 and is housed in an axial bore of the valve-head 17.

Figure 4:
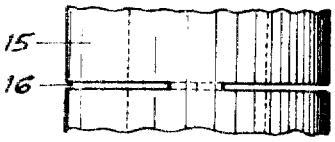
FIGURE 4 is an elevation of a fragment of the lighter valve casing.
Figure 5:
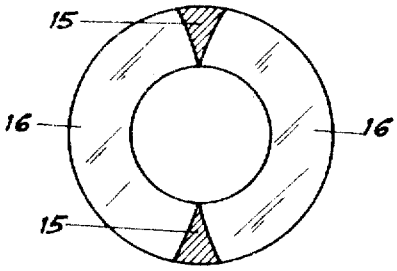
FIGURE 5 is an inverted plan section taken on V—V in FIGURE 1.

Finally, the wall of the casing 15 has two very narrow slots 16, see also FIGURES 4 and 5, preferably formed by circular milling cutters of a thickness of 2–3 tenths of a millimetre and of a diameter of about 18 mm., which connect the interior of the tank of the lighter to the bore 29 around the stem 17a. The slots 16 are perpendicular to the axis of the casing 15 and are therefore horizontal during filling of the lighter.

A space 28 is formed between the slots 16 and the wall 11 of the lighter tank and, as will hereinafter be seen, becomes filled with a gaseous mixture and forms a safety zone.

The length of the nozzle 8 must be greater than the distance which, in the open position of the lighter filling valve head, separates the free face of the valve-head 17, that is to say the top surface of the gasket 14, from the free end of the body 12, that is to say the surface 12b of this body 12 situated at the opposite end to the seat 12a, so that the end 1b of the supply valve casing 1 always leaves an escape passage between itself and the body 12 for the gaseous mixture expelled by the introduction of a fresh charge of liquefied gas into the lighter.

It will be seen that it is very important that the outer surface of the nozzle 8 and the inner surface of the part 12 should be machined with great precision so that the diameters of these surfaces may be strictly constant over the entire length of the elements, and thus ensure that the extremely small clearances mentioned above may be obtained. On the other hand, the machining precision for the slots 16 need not be so strict, in view of the proportionally much larger dimensions of these slots.

Figure 6:
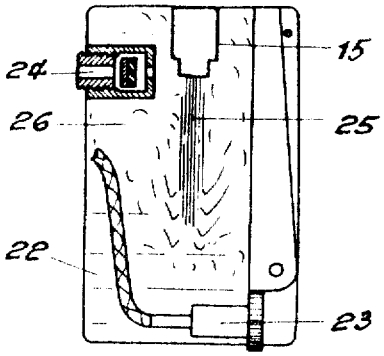
FIGURE 6 is a partial very diagrammatic sectional elevation of a known lighter provided with an independent escape or blow-off valve and wherein the filling valve does not have a jet-breaker device.
Figure 7:
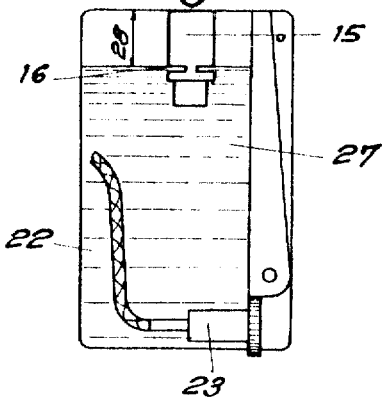
FIGURE 7 is similar to FIGURE 6 but shows a lighter of the same type in which the separate escape valve has been eliminated and replaced by a valve system according to the invention.

In FIGURES 6 and 7 lighters each comprising a wick 22 and a burner 23 are shown diagrammatically. In FIGURE 6, the lighter of known type has a filling valve 15 and an independent escape or blow-off valve 24. In FIGURE 7, the lighter is equipped with a valve system 15 according to the invention, and has no separate and independent escape valve fitting.

Figure 9:
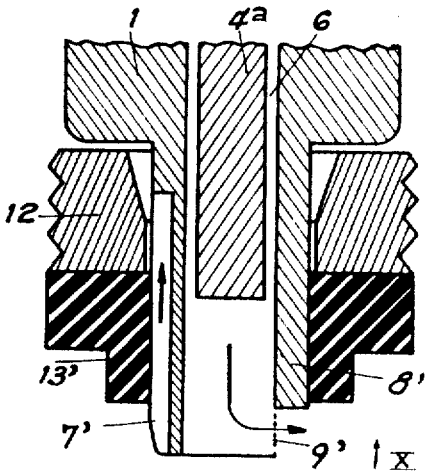
FIGURES 8–10 are similar views to FIGURES 1–3 respectively and show a modification of the escape or blow-off means, FIGURE 10 being a view in the direction of the arrow X in FIGURE 9.
Figure 8:
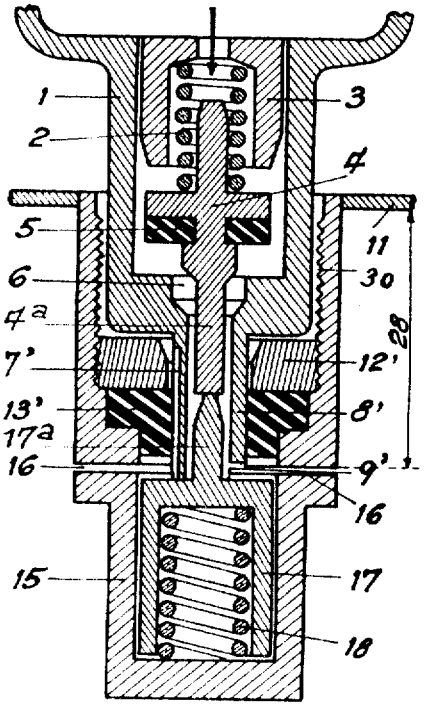
Figure 10:
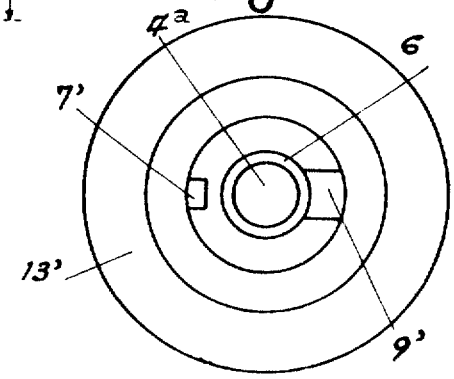

In the modifications shown in FIGURES 8–10, parts like those in FIGURES 1 to 5 are given like references and the modified parts are given like references accompanied by a prime. The essential difference between the two constructions lies in the fact that the escape duct is in this case constituted by a groove 7' formed externally in the thickness of the wall of the cylindrical nozzle 8' of the gas supply cylinder. The notch 9' is formed in the wall of the nozzle practically diametrically opposite the groove 7'. The seat for the valve-head 17 is in this case formed by the surface of a gasket 13', preferably of rubber or similar material, which has an axial bore of such a diameter as will enable the nozzle 8' to be inserted with slight friction, this gasket 13' being held down by a part 12', similar to the body 12 in FIGURES 1 and 2, which is screwed into the screwthread 15a. The part 12' and the gasket 13' constitutes a lighter sealing and valve-seating assembly.

Filling the lighter and at the same time releasing the escape passages are effected as follows: After the plug (not shown) screwed into the screw-thread 15a has been withdrawn, the nozzle 8 is inserted. This insertion brings the two stems 4a and 17a of the valve-heads 4 and 17 into contact with one another; since care has been taken to make the spring 2 of the valve-head 4 more powerful than the spring 18 of the valve-head 17, the latter opens first; at that instant, the end of the nozzle 8 is in sealing-tight contact with the gasket 14 of the valve-head 17; if the nozzle 8 is inserted further, the valve-head 17 reaches the end of its stroke and the valve-head 4 opens in turn against the resistance of the spring 2, thus enabling the liquefied gas to flow through the annular space 6 and to pass through the notch 9 into the tank of the lighter through whichever of the two slots 16 is situated opposite said notch, while the gaseous mixture contained in the tank passes through the opposite slot 16 to be expelled to atmosphere through the drain duct 7 or 7'. At the precise moment when the height of the liquid 27 (FIGURE 7) reaches the level of the slots 16, the gaseous mixture remaining in the lighter tank is imprisoned in the safety zone 28. The inflow of liquefied gas continues but there is then an escape of liquefied gas through the drain 7 or 7' in the form of a fine clearly visible mist. The supply cylinder is then withdrawn and the two valve-heads of the valves 4 and 17 instantaneously re-close under the action of the springs 2 and 18. The lighter tank now has stored within it the required amount of fuel.

In FIGURES 1, 2, 8 and 9, arrows clearly indicate the path followed by the liquefied gas introduced into the lighter, and the escape path taken by the gaseous mixture expelled to atmosphere.

With reference to FIGURE 6, it will be seen that lighters having an escape valve independent of the filling valve may be very rapidly filled with liquefied gas, within 3–5 seconds only in practice, since the outflow through these escape valves is equal to, if not greater than, the inflow through the intake valve ducts; it follows from this that the liquefied gas under pressure meets practically no resistance within the tank and is swept into the latter where its jet 25, of great force, produces turbulence and bubbling 26; it follows that the liquefied gas is projected violently towards the top part of the lighter tank, and that a certain amount thereof is expelled to atmosphere together with the gaseous mixture through the escape valve 24 before the actual level of liquefied gas in the tank has reached the desired height; experience shows that in these conditions it is impossible for the lighter to be filled with a strictly proportioned amount of fuel; filling is carried out only up to ⅖ to ⅗ of the required volume, depending on the greater or lesser force of the jet 25. This phenomenon naturally takes place in the closed interior of the lighter tank and remains invisible and hence outside the user's knowledge. It is very important to recognise, however, since pocket-lighter tanks have only a relatively small capacity, varying from 4–8 grams of liquid butane, and can give an average smoker two to four months' service, that if the lighter tank is filled only to ⅖ to ⅗ of its actual capacity, the average duration of the filling will only be from 1–2 months instead of from 2–4 months. In view of the structure of the escape ducts and of the intake valves of lighters of this kind it is very difficult for the lighter manufacturers to obviate this serious disadvantage.

According to the invention, on the other hand, the possible outflow through the escape duct 7 or 7' is much less than the inflow of liquid gas past the intake valve; as a result, during filling of the lighter the gaseous mixture cannot be expelled so rapidly and hence undergoes a considerable compression which has the effect of braking the inflow of liquefied gas; moreover, contrary to known intake valves, in which the jet of liquefied gas 25 is discharged directly into the lighter tank, the jet produced according to the invention flows horizontally through one of the very narrow slots 16 which stems the stream of butane liquid and acts as a jet-breaker; the fuel flows slowly into the tank without any turbulence. Filling of the lighter is naturally of necessity slightly slower (5–10 seconds instead of from 3–5) but each filling is complete and strictly regulated as regards quantity.

Furthermore, in all gas lighter tanks there must be a safety zone full of a gaseous mixture after filling with the liquefied gas; this safety zone which varies according to the capacity of the tank may be obtained very easily according to the invention without the slightest modification to the essential components of the supply cylinder valve or the lighter valve The neck of the storage or supply cylinder in which the valve elements (in practice the valve casing 1) are mounted is very long and can thus be introduced to a greater or lesser depth into the casing 15; it is only necessary to lengthen or shorten this casing for the slots 16 to be farther away from or nearer to the wall 11, thus varying the height of the safety zone 28.

The quantitatively proportioned filling of gas lighters of different shapes or capacities is therefore rendered possible by the invention and hence it is possible to use large gas-cylinders containing a sufficient amount of liquefied gas to permit repeated filling of the lighters. These gas cylinders being provided with valves which are practically proof against wear, provision can readily be made for empty cylinders to be changed for full cylinders. It would thus be possible finally to make liquefied gas available to users at very low prices, and this would promote an expansion in the sale of gas lighters. The users of such lighters could in turn fill such lighters easily, rapidly and, particularly, very economically.

The present invention is naturally not limited to the embodiments described and illustrated but covers all modifications as regards form and dimensions; it applies to all types of liquefied gas lighter without exception, the ignition mechanism of which may be manual, semi-automatic or automatic, within the range defined by the following claims.

I claim:

1. An arrangement for filling with liquefied gas contained in a gas supply cylinder a lighter tank having a top wall, lateral walls and a bottom wall, comprising in combination, (a) a cylindrical supply valve casing in said gas supply cylinder, (b) a supply valve seat in said supply valve casing, (c) a supply valve head movable towards and away from said supply valve seat in said supply valve casing, (d) a supply valve stem connected to said supply valve head, (e) a cylindrical lighter valve casing in the top wall of the tank, (f) a lighter sealing and valve-seating assembly having two parallel annular end faces one of which is adjacent to said supply valve casing and the other is directed towards the interior of the tank and forms a lighter valve seat in said lighter valve casing, (g) a lighter valve head movable towards and away from said lighter valve seat in said lighter valve casing, (h) a lighter valve stem connected to said lighter valve head, (j) said stems coming into contact with each other to effect opening of said valve heads, (k) a biasing spring for each of said valve heads, (l) the biasing spring for the supply valve head being more powerful than the biasing spring for the lighter valve head, (m) a spring abutment in each of said valve casings and on each of said valve stems, (n) a cylindrical nozzle terminating said supply valve casing towards the exterior of said gas supply cylinder, (o) a notch at the outer edge of said nozzle, (p) a slot closable by said lighter valve head, formed of two diametrically opposed sectors each extending over a little less than 180°, provided in the cylindrical wall of said lighter valve casing, and located in a plane perpendicular to the axis of said lighter valve casing at a distance from the top wall of the tank determining the height of a desirable safety zone in which there must be a gaseous mixture when the tank is full, (q) an escape duct having a wall which is partially formed in said lighter sealing and valve-seating assembly in communication with said slot and leading to the atmosphere, (r) said notch in said nozzle being in communication with said slot when said supply cylinder is seated over said lighter tank for filling said tank, and (s) the effective area of said escape duct being substantially less than that of said notch in said nozzle.

2. The arrangement as defined in claim 1, wherein:

(a) the length of said cylindrical nozzle is greater than the distance which, in the open position of both said valve heads, separates the sealing surface of said lighter valve head from the end face of said lighter sealing and valve-seating assembly adjacent to said supply valve casing, and (b) the outside diameter of said supply valve casing is less than the inner diameter of said lighter valve casing.

3. An arrangement as defined in claim 2, wherein the inside diameter of said lighter sealing and valve-seating assembly is about 5–10 hundredths of a millimeter larger than the outside diameter of said cylindrical nozzle, and the escape duct is formed by the annular space bounded by said nozzle and assembly during filling of the lighter.

4. An arrangement according to claim 1, wherein said cylindrical nozzle penetrates with slight friction into a sealing gasket forming a part of said lighter sealing and valve-seating assembly and an end face of which forms said lighter valve head seating, the escape duct is formed by a groove disposed along a generatrix of the cylindrical outside surface of said nozzle, and the notch is diametrically opposite said groove.

*5. Apparatus for filling a liquefied gas fuel lighter tank from a supply tank containing liquefied gas fuel comprising in combination*

*a supply tank discharging assembly having*

*a supply casing integral with said supply tank and having passage means therebetween,*

*a nozzle extending from said supply casing having a notch in its side at the outer end thereof, and*

*a first valve means within said supply casing having a valve seat, a valve and spring means for closing said valve against said valve seat in the inoperative position,*

*said supply tank discharging assembly providing passage means from said supply tank past said first valve means in the operative position in said supply casing, through said nozzle and through said notch to said lighter tank,*

*a lighter tank charging assembly having*

*a lighter casing having one end integral with a wall of said lighter tank and extending thereinto, and having slots in a plane perpendicular to its longitudinal axis, and*

*a second valve means within said lighter casing having a valve seat, a valve and spring means for closing said valve against said valve seat in the inoperative position, said second valve means being located between said lighter tank and said slots,*

*said second valve being movable in said lighter casing from its seated position to an operative position beyond said slots so that said lighter casing provides passage means from the interior of said lighter tank through said slots and past said second valve seat,*

*said nozzle being adapted to fit into said lighter casing so that the end of said nozzle bears and closes against said second valve to open said second valve and extends through said second valve seat so that said notch is in the plane of said slots in the operative position, and said nozzle being adapted to provide exhaust duct means between itself and said second valve seat and said lighter casing, said exhaust duct means communicating with at least one of said slots and being open to the atmosphere,*

*said first valve having means extending therefrom for engaging said second valve to open said first valve in the operative position,*

*said first and second valves being moved to their operable positions by urging said supply tank discharging assembly and said lighter tank charging assembly together against the pressures of their respective*

*spring means thereby to provide passage means for filling liquefied gas fuel from said supply tank past said first valve means in said supply casing, through said nozzle extending through said second valve seat, through said notch and through one of said slots into the interior of said lighter tank, and to provide passage means for exhausting vapors from within said lighter tank through another of said slots and through said exhaust duct means to the atmosphere.*

*6. Apparatus according to claim 5 wherein said nozzle and said first valve are an integral element, one end of said element being within said supply casing and forming said first valve and the other end of said element extending from said supply casing and forming said nozzle, said nozzle being the means extending from said first valve to engage said second valve to effect the opening of both said valves.*

*7. Apparatus according to claim 5 wherein said first valve has a stem extending therefrom and into said nozzle to engage said second valve to effect the opening of said first valve.*

*8. Apparatus according to claim 7 wherein said second valve has a stem extending therefrom into said nozzle in the operative position to engage said first valve stem to effect the opening of said first valve.*

*9. Apparatus according to claim 5 wherein said nozzle has an outside diameter smaller than the inside diameter of said lighter casing and said second valve seat to provide an annular space therebetween forming said exhaust duct means.*

*10. Apparatus according to claim 5 wherein said nozzle has a longitudinal groove in its exterior surface to provide said exhaust duct means.*

*11. Apparatus according to claim 5 wherein the effective area of said exhaust duct is substantially less than the effective area of said notch.*

*12. Apparatus according to claim 5 wherein the plane of said slots is at a distance from said wall of said lighter tank sufficient to provide a desirable safety zone of fuel vapor when said lighter tank is filled.*

*13. Apparatus according to claim 5 wherein said first valve means spring means requires more force to be overcome than the force required to overcome said second valve means spring means to insure that said second valve will open before said first valve when said supply discharging and lighter charging assemblies are urged together.*

References Cited by the Examiner

The following references, cited by the Examiner, are of record in the patented file of this patent or the original patent.

UNITED STATES PATENTS

| | | | |
|---|---|---|---|
| 2,989,091 | 6/1961 | Lowenthal | 141—294 |

FOREIGN PATENTS

| | | |
|---|---|---|
| 141,187 | 3/1935 | Austria. |

LAVERNE D. GEIGER, *Primary Examiner.*

H. S. BELL, *Assistant Examiner.*